BAR GRINDER
Filed March 17, 1969 2 Sheets-Sheet 1
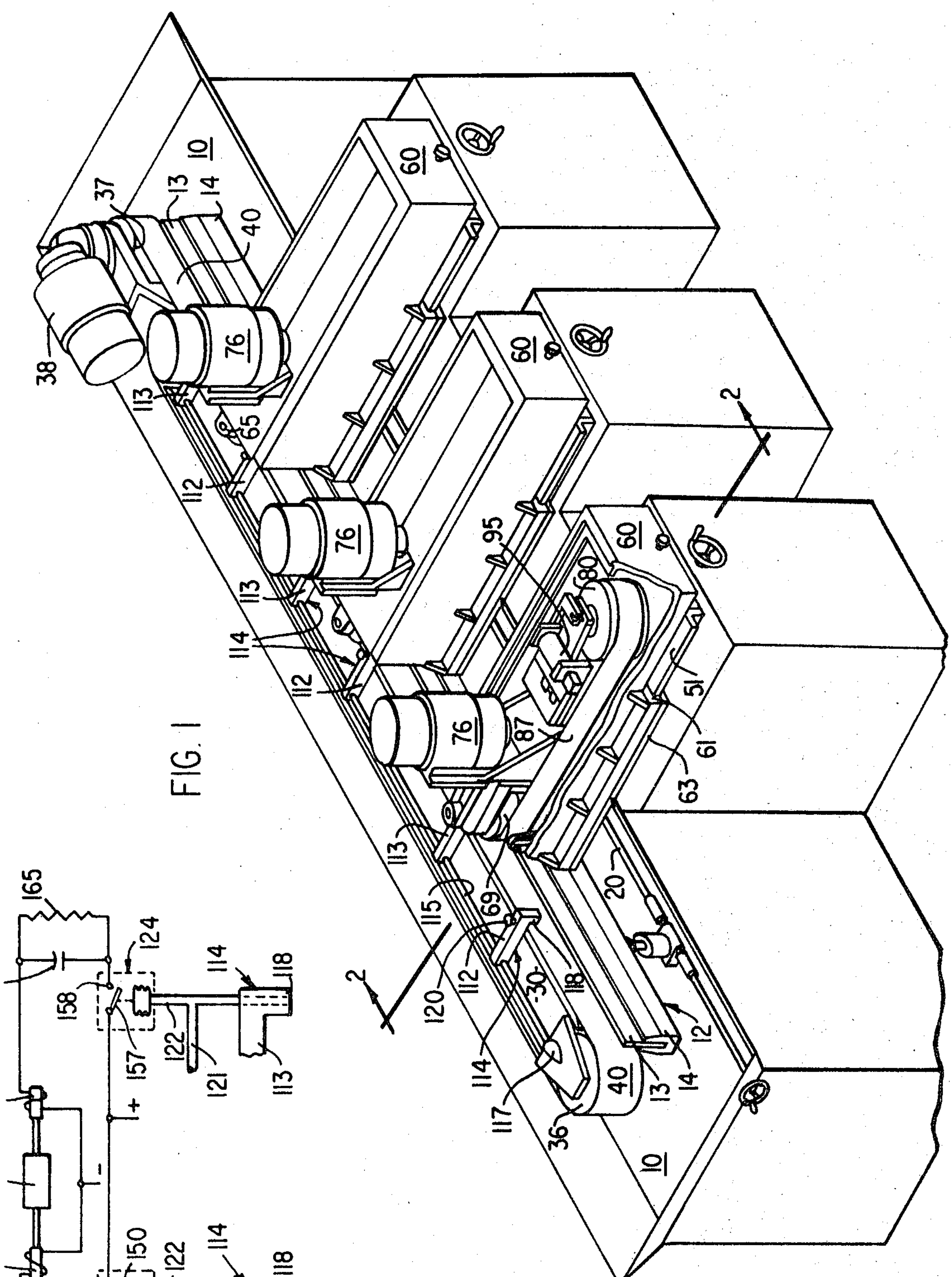
INVENTORS.
BRIAN M. SCHALLER.
ROBERT L. SCHALLER.
BY
Hofgren, Wegner,
Allen, Stellman & McCord
Att'ys

BAR GRINDER

Filed March 17, 1969

INVENTORS.
BRIAN M. SCHALLER.
ROBERT L. SCHALLER.
BY
Hofgren, Wegner,
Allen, Stellman & McCord
Att'ys

United States Patent Office 3,555,740 Patented Jan. 19, 1971

3,555,740

BAR GRINDER

Brian M. Schaller and Robert L. Schaller, Camillus, N.Y., assignors to Sundstrand-Engelberg Inc., a corporation of Delaware Filed Mar. 17, 1969, Ser. No. 807,525
Int. Cl. B24b *21/04, 7/12*
U.S. Cl. 51—138 7 Claims

ABSTRACT OF THE DISCLOSURE

Bars are ground in the machine by being advanced along a horizontally disposed work rest past a grinding head. The bars are advanced by a conveyor having a platen extending along one side of the work rest. Power means is provided for moving the grinding head toward and from the conveyor to move the grinding head element into and out of grinding engagement with the advancing bars. Sensors are provided for effecting movement of the head, whereby an area of predetermined length is ground on each bar in a preselected area. The conveyor platen may be tiled to grind the bars on a bevel, and the grinding head is tiltable for grinding relatively narrow bevels along the top and bottom edges of the bars.

BRIEF SUMMARY OF THE INVENTION

This invention is directed to a machine for grinding the side surface of bars which are advanced successively by a conveyor along the upper edge of the work rest. Grinding heads are spaced along the rest and each head includes a power means operable to move the grinding element of the head into and out of engagement with the bars while being advanced along the work rest. If the bars are formed of ferrous material, a magnetic conveyor is preferred. The conveyor includes a flat platen extending in parallel adjacency to one side of the work rest. A run of an endless belt is moved over the platen. The work pieces are held against the belt in frictional engagement therewith by a series of magnets positioned behind the platen.

A pair of sensors is associated with each grinding head. One sensor is located immediately upstream from the grinding head, in relation to the movement of the bars, and upon the approach of the leading end of a bar in the effective field of the sensor, the grinding head is moved into grinding position. The second sensor is spaced downstream from the grinding head a distance equal to the length of the surface to be ground and, as the leading end of the bar enters the effective field of the second sensor, the grinding head is moved out of grinding engagement with the bar. The second sensors are adjustable in a direction lengthwise of the conveyor and work rest, whereby the length of the area ground on each bar may be varied. Stop means is provided to limit movement of each head toward the bar, and serves to limit the amount of material removed from the bar by each head. The conveyor, including the back-up plate, can be tilted to provide a bevel surface on the ground bar. Each grinding head is also tiltable for grinding a more narrow bevel along either the top, or bottom, edges of the bar.

BRIEF DESCRIPTION OF DRAWINGS

FIG. 1 is an isometric top plan view of a grinding machine embodying our invention.

FIG. 2 is a view taken on line 2—2, FIG. 1.

FIG. 4 is a view taken on line 4—4, FIG. 2.

FIG. 5 is a schematic diagram of a sensor arrangement.

DETAILED DESCRIPTION

Figure 3:
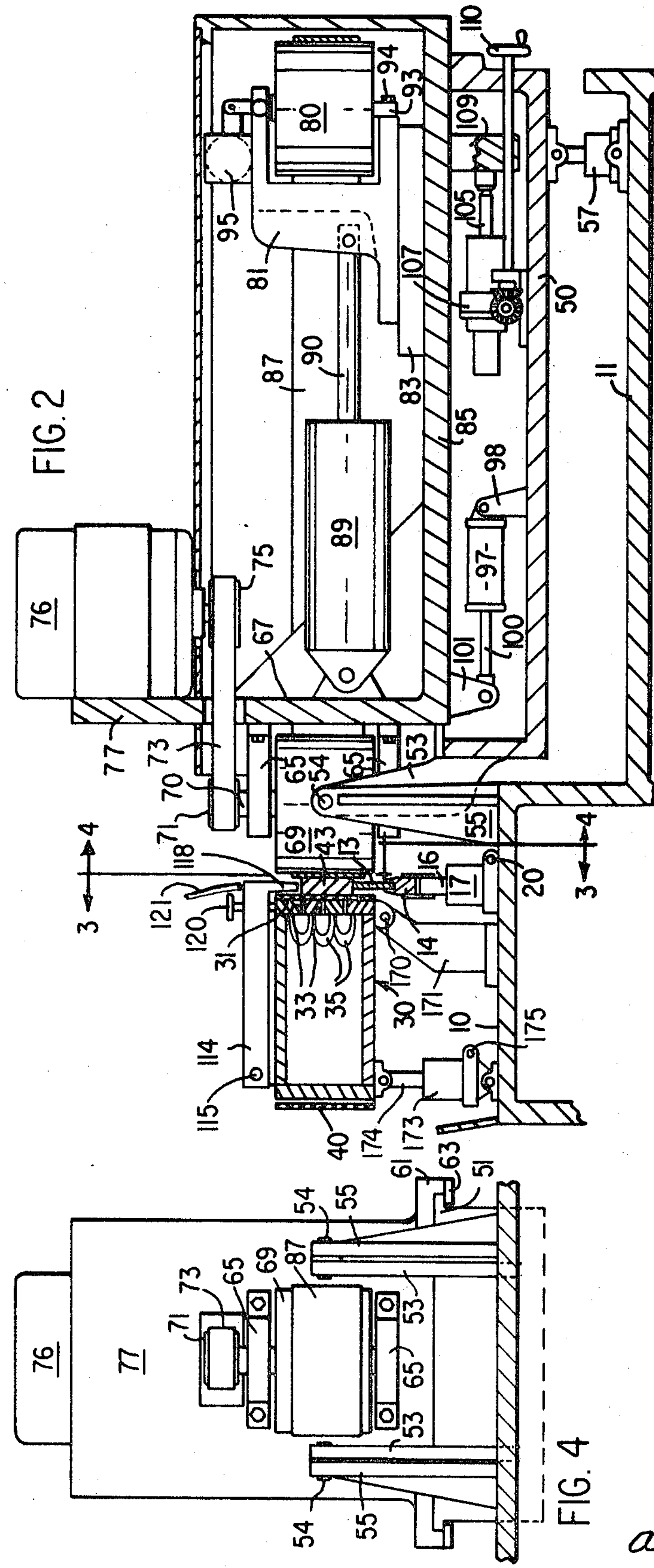
FIG. 3 is a view taken on line 3—3, FIG. 2.

The conveyor and grinding units are mounted on a cabinet structure, as shown in FIG. 1. The cabinet structure is provided with elongated top surfaces 10 and 11. A work rest 12 is mounted upon the top cabinet surface 10. The work rest consists of an elongated blade 13 fixed in a support 14. The support 14 is pivotally mounted at 15 to the upper ends of elevating screws 16 in jacks 17 mounted on the top wall 10. The jacks 17 are of conventional form including a worm wheel nut operated by a worm. The worms of the jacks are connected by a shaft 20, see FIG. 3, for operation in unison. With this arrangement, the work rest blade 13 may be adjusted vertically.

The conveyor illustrated consists of an elongated box member 30, rectangular in cross section, see FIGS. 1 and 2. One side of the box member is provided with a sheet 31 of wear resisting material forming a flat platen extending in parallel adjacency to the work rest blade 13. The wall of the box structure 30, to which the wear strip 31 is affixed, is formed of ferrous material provided with non-ferrous spacers 33. A series of permanent magnets 35 is affixed to the inner surface of the wall. Pulleys 36, 37, are mounted at the ends of the box structure for rotation about vertical axes. Rotation is imparted to one of the pulleys, as pulley 37, by a variable speed motor drive 38, see FIGS. 1 and 3. An endless belt 40 is trained about the pulleys with one run of the belt overlying the platen 31. The magnets 35 serve to maintain the bars of ferrous material snugly against the belt 40 to provide sufficient frictional engagement for the advancement of the bars 43 along the work rest plate 13. A series of bars designated 43, 44, 45 and 46, are shown in FIG. 3.

One or more grinding units are mounted at the opposite side of the work rest. In the arrangement shown in FIG. 1, there are three grinding units, all embodying the same structural arrangement. Each grinding unit consists of a base member 50 substantially U-shaped in cross section. The base members 50 are formed along the top edges at opposite sides with outwardly extending flanges 51. One end wall of the base members 50 is formed with upwardly extending arms 53, which also extend forwardly of the base member toward the work rest. The upper ends of the arms 53 are apertured to receive pins 54 mounted in lugs 55 extending upwardly from the cabinet top wall 10. An elevating jack 57 is mounted on the cabinet top wall 11 and is attached to each base 50 toward the rear end thereof, see FIG. 2. The jacks 57 serve to tilt the base 50 and the grinding head thereon about the pins 54. Each grinding head includes a frame in the form of a box member 60 formed with laterally extending flanges 61 having sliding engagement with the flanges 51 of the base members. The outer portions of the flanges 61 extend downwardly for sliding engagement with the edges of the flanges 51 on the base members. This sliding interconnection is completed by gibs 63. Arms 65 are attached to the front wall 67 of the head frame and extend toward the work rest. A contact roll 69 is mounted on a shaft 70 journalled vetrically in the arms 65. The shaft is provided at its upper end with a pulley 71. A belt 73 is trained over the pulley 71, and a pulley 75 fixed to the output shaft of a motor 76 mounted on the upwardly extending portion 77 of the front wall 67, see FIG. 2.

An idler roll 80 is journalled vertically in a yoke member 81 slidably mounted on a way structure 83 formed on the bottom wall 85 of the head frame. An abrasive belt 87 is trained about the contact roll 69 and the idler roll 80. A cylinder 89 is attached to the front wall 67 of the head frame, and the piston rod 90 is connected to the yoke 81, the cylinder and piston structure serving to maintain proper tension on the abrading belt 87.

The idler roll 80 is journalled on a shaft 93 pivotally mounted at one end by screw 94 to one leg of the yoke 81. A cylinder structure 95 is mounted on the opposite leg of the yoke and is operable to effect oscillation of the idler roll shaft 93 about its pivot 94. This arrangement results in vertical oscillation of the abrading belt during operation of the machine. A cylinder 97 is connected to a lug 98 fixed to the base 50. The piston rod 100 is connected to a lug 101 depending from the bottom wall 85 of the head frame. This piston and cylinder structure serves, when supplied with fluid under pressure at alternate ends, to effect oscillation of the grinding head along ways 51 toward and from the work rest. It will be apparent that fluid pressure applied to the rear end of cylinder 97 will effect movement of the abrasive belt 87 into grinding engagement with the work piece 43 positioned on the work rest blade 13. The extent of this movement toward the work rest is determined by an adjustable stop 105, which is in the form of the stem of a screw jack 107 fixed to the base 50. The stop 105 is engaged by a lug 109 depending from the bottom wall 85 of the grinding head frame. The stop 105 is adjusted by operation of the hand wheel 110.

As the bars 40 are advanced along the work rest blade 13, the grinding heads are reciprocated on the base 50 through the instrumentality of the cylinder and piston structures 97, 100. The flow of fluid to the cylinder 97 of each head is controlled by a pair of sensors, indicated at 112, 113. These sensors may be of any conventional form, or type, which will function to sense the presence of the leading ends of the bars being advanced on the work rest and provide a pulse to the valve for controlling the flow of fluid to the cylinder 97. For example, they may be of the pneumatic type including an arm 114 pivotally mounted at one end on a rod 115 supported at its ends in brackets 117 fixed to the top of the conveyor box structure.

These arms are formed with a depending portion 118 having a passage extending through the lower ends of the arm, and the arms are provided with adjusting screws 120 to position the lower end of the depending portion in close proximity to the upper edges of the bars 43. The passageways in the arms are connected by a tube 121 to a source of air under predetermined pressure. When the upper edge of a bar is positioned below a projection 118, an increase in pressure is developed in the branch tube 122 connected to pressure sensitive devices 123, 124, see FIG. 5. This rise in pressure is due to the impedance to the flow of air from the depending arm because of the presence of the bar immediately thereunder. Conversely, with no bar positioned under a sensor, there is a drop in pressure in the branch tube 122. This type of sensor is well known and used extensively. The sensors 112, associated with the grinding heads, are located immediately upstream, relative to the movement of the bars 40, from the contact wheels of the associated heads.

The bars 43, 46, shown in FIG. 3, are tow bars used in trailer hitches for attaching a trailer to a motor vehicle. One end of each bar is rounded, as indicated at 130. The machine functions to grind these bars in an area extending a predetermined distance from the rounded ends 130 as, for example, as indicated by the line 131 on bars 44, 45 and 46. The bars are placed on the work rest with the rounded ends extending downstream. They may be positioned in end to end contact, as bars 43, 44, or they may be advanced in spaced apart relation, as shown by bars 45, 46, in FIG. 3. If these bars are placed in abutting relation, the rounded ends 130 form a depression for the more ready escape of the fluid from the sensors, thus momentarily reducing the pressure in the branch lines 122 for operation of the pressure respective devices 123, 124.

As a bar is advanced on the work rest and approaches the first sensor 112, pressure in that branch tube 122 rises, causing the contact 150 of pressure responsive device 123 to move into engagement with the contact 151. The contact 150 is connected to the positive side of the DC supply. Accordingly, with this actuation a pulse is transmitted to coil 153 of valve 154, through the capacitor 155. The valves 154 are two position, four way valves. When the valve 154 is shifted by coil 153, fluid is exhausted from the front end of cylinder 97 and pressure is applied to the rear end of the cylinder, moving the associated head to bring the abrading element 87 into grinding engagement with the bar.

When the end of the bar being ground advances to a position below the sensor 113, valve coil 161 is energized to shift the valve 154 to the second position to connect the rear end of the cylinder 97 to exhaust and apply pressure to the front end of the cylinder to retract the head. Each of the abrading heads embodies the same structural arrangement and is provided with the same sensor arrangement.

When the leading end of the next succeeding bar is positioned below the sensor 112, the coil 153 will be again energized, effecting inward movement of the grinding head regardless of the fact that the rear portion of the previously ground bar is still passing beneath the associated sensor 113. This is due to the fact that the coils 153, 161, are energized by an impulse. In the arrangement shown, the capacitors 155, 160, are selected for capacitance sufficient to provide a pulse with ample current for proper energization of the valve coils. A resistor 165 is connected in shunt with each capacitor and is selected to have a value sufficient to effect discharge of the capacitor prior to the next succeeding impulse from the pressure responsive device. As previously stated, sensors of other structures and arrangements can be employed for operating the valve 154.

It will be apparent that the length of the area ground may be varied by adjusting the position of the sensors 113 relative to the sensors 112. Also, the location of the area ground may be selected by adjusting the sensors 112. For example, the sensors 112 may be positioned downstream from the grinding heads, for grinding an area intermediate the ends of the bars. In any event, the ground surface will be uniform on all bars whether they are advanced in abutting relation, or in spaced relation, and regardless of their length.

The tilting of the grinding heads about the pivots 54 permits grinding the bars at an angle to provide a bevel surface. To increase the versatility of the machine, the conveyor 30 is pivotally mounted on pivots 170, to columns 171 fixedly secured to the top wall 10 of the base structure. The conveyor 30 is moved about the pivots 170 by power operated jacks 173, the screws 174 of which are pivotally connected to the conveyor structure adjacent the rear side thereof, see FIG. 2. Upon operation of the jacks 173, the conveyor platen 31 is moved in selected angular relation to the vertical plane in which the work rest 13 is positioned. The jacks 173 are operatively connected together by shaft 175 for operation in unison.

What we claim is:

1. A bar grinding machine comprising a frame, an elongated horizontally disposed work rest, a bar conveyor extending in parallel adjacency along one side of said work rest and being operable to advance bars along the upper edge of said rest, a grinding unit mounted on the frame at the opposite side of said rest, said unit including a power-operated grinding head having a grinding element and a reversible power-operated head moving means for horizontally moving the head toward and from said conveyor, adjustable stop means for limiting the movement of said head toward the bar, first and second sensors associated with said grinding head, said first sensor being operable, upon the leading end of an advancing bar entering the effective field of said sensor, to effect actuation of said head moving means to effect movement of the grinding element of said head into grinding engagement with said bar, said second sensor being located downstream from said first sensor and operable, upon the leading end of said bar entering into the effective field of said second sensor, to effect actuation of said head moving means in reverse to move the grinding element of said associated head out of grinding engagement with the work piece.

2. A bar grinding machine as set forth in claim 1, wherein said sensors are adjustable in a direction lengthwise of said work rest.

3. A bar grinding machine as set forth in claim 1, wherein said conveyor is mounted for movement about a horizontal axis extending in parallel relation to said work rest.

4. A bar grinding machine as set forth in claim 1, wherein said grinding head is movable about a horizontal axis toward and from said work rest.

5. A bar grinding machine as set forth in claim 1, wherein said grinding element consists of an endless abrading belt trained over a contact roll and an idler roll, said rolls being journalled for rotation about a vertical axis and said contact roll being located in juxtaposition to said work rest.

6. A bar grinding machine comprising a frame, an elongated horizontally disposed work rest, a bar conveyor extending in parallel adjacency along one side of said work rest and being operable to advance bars along the upper edge of said rest, a plurality of grinding units mounted on said frame in spaced relation along the opposite side of said rest, each of said units including a power-operated grinding head having a grinding element and a reversible power-operated head moving means for horizontally moving said head toward and from said conveyor, an adjustable stop means for limiting the movement of each of said heads toward a bar positioned on said rest, first and second sensors associated with each of said grinding heads, said first sensor being operable to effect actuation of said head moving means to effect movement of the grinding element of said head into grinding engagement with said bar, said second sensor being located downstream from said first sensor and operable upon the leading end of said bar entering into the effective field of said sensor to effect actuation of said head moving means in reverse to move the grinding element of said associated head out of grinding engagement with the work piece.

7. A bar grinding machine as set forth in claim 6, wherein each of said grinding heads is movable about a horizontal axis toward and from said work rest.

References Cited

UNITED STATES PATENTS

| | | | |
|---|---|---|---|
| 2,551,332 | 5/1951 | Moore et al. | 51—110 |
| 2,970,410 | 2/1961 | Gittins | 51—110 |
| 3,006,116 | 10/1961 | Knost | 51—110X |
| 3,178,860 | 4/1965 | Clyne | 51—138 |
| 3,208,187 | 9/1965 | Ernst | 51—138X |
| 3,427,643 | 11/1969 | Murray | 51—137X |

OTHELL M. SIMPSON, Primary Examiner

U.S. Cl. X.R.

51—76, 110